United States Patent [19]

Asmussen

[11] Patent Number: 5,678,622

[45] Date of Patent: Oct. 21, 1997

[54] ROLL-UP THERMAL INSULATOR

[76] Inventor: Edgar Asmussen, Schulstrasse 1, D-24941 Jarplund-Weding (Flensburg), Germany

[21] Appl. No.: 137,145

[22] PCT Filed: Apr. 13, 1992

[86] PCT No.: PCT/EP92/00835

§ 371 Date: Apr. 28, 1994

§ 102(e) Date: Apr. 28, 1994

[87] PCT Pub. No.: WO92/18737

PCT Pub. Date: Oct. 29, 1992

[30] Foreign Application Priority Data

Apr. 16, 1991 [DE] Germany .................... 9104579 U

[51] Int. Cl.⁶ ........................................ E06B 9/08
[52] U.S. Cl. ............................ 160/121.1; 160/41
[58] Field of Search ................... 160/121.1, 120, 160/122, 241, 271, 272, 273.1, 41

[56] References Cited

U.S. PATENT DOCUMENTS

| | | | |
|---|---|---|---|
| 2,865,446 | 12/1958 | Cole | 160/121.1 X |
| 4,194,550 | 3/1980 | Hopper. | |
| 4,344,473 | 8/1982 | Shore | 160/121.1 |
| 4,344,474 | 8/1982 | Berman | 160/121.1 |
| 4,408,650 | 10/1983 | Verch | 160/121.1 |
| 4,453,584 | 6/1984 | Steele | 160/121.1 |
| 4,506,720 | 3/1985 | Iwanicki | 160/121.1 X |
| 4,802,523 | 2/1989 | Scholten et al. . | |

FOREIGN PATENT DOCUMENTS

| | | |
|---|---|---|
| 0 132 497 | 2/1985 | European Pat. Off. . |
| 1309194 | 10/1962 | France . |
| 7805464 | 10/1979 | Netherlands . |

*Primary Examiner*—David M. Purol
*Attorney, Agent, or Firm*—Fliesler Dubb Meyer & Lovejoy LLP

[57] ABSTRACT

A roll-up heat insulation device in the form of a planar structure which, in the unrolled state, forms a multichamber system for providing air-filled, preferably circulation-free, compartments where volume can be reduced again when being rolled up. The planar structure is constructed in the form of a heat insulating mat which possesses at least two consecutively disposed foils, where reciprocal distance is controllable with the aid of distance webs that are offset in the vertical distance (AV) and are flexibly joined to adjacent foils.

15 Claims, 6 Drawing Sheets

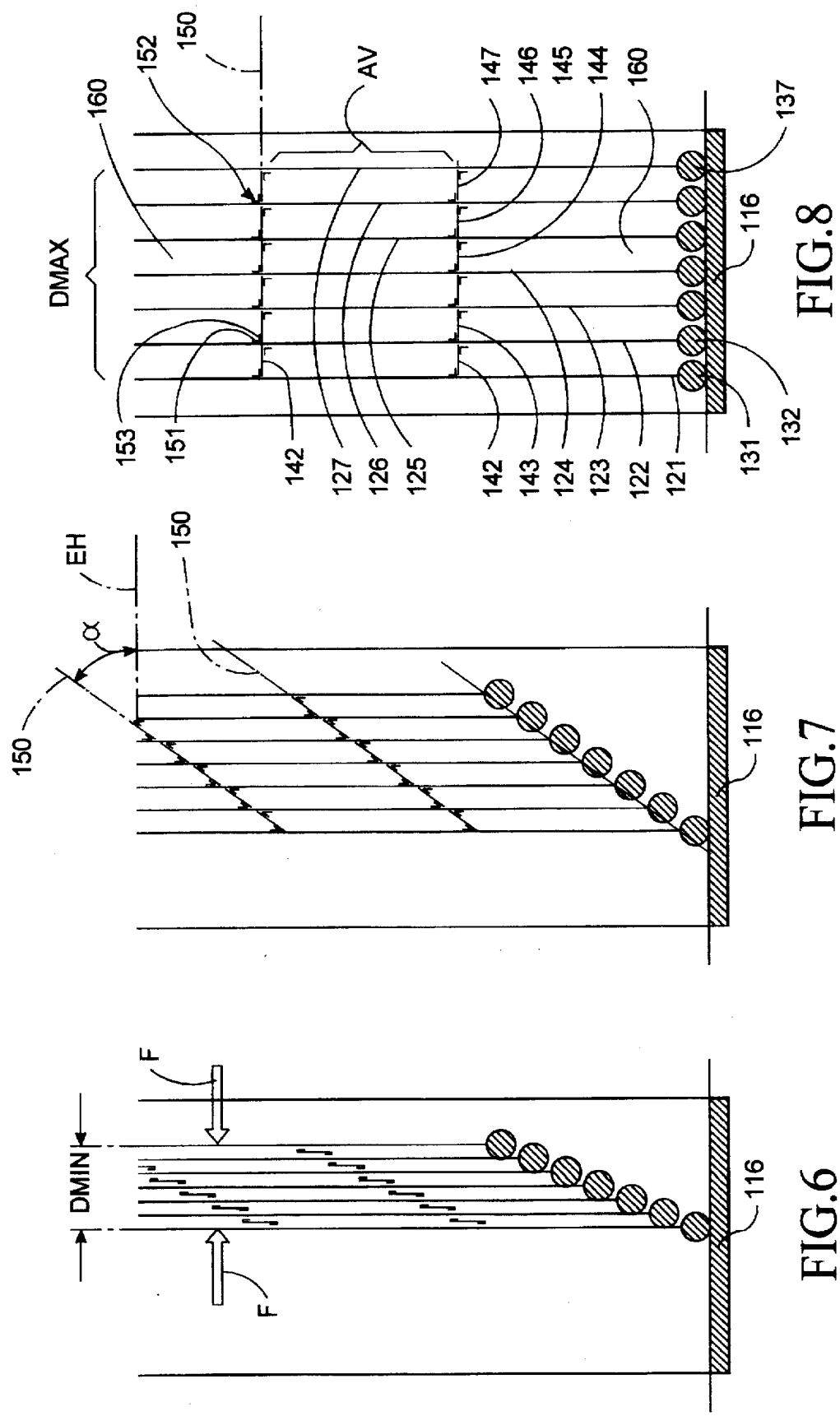

ROLL-UP THERMAL INSULATOR

FIELD OF THE INVENTION

The present invention relates to a roll-up heat insulation device in the form of a planar structure for making available air-filled, circulation-free compartments, whose volume, when rolled up, can be further reduced and which is constructed in the form of a heat insulating mat.

BACKGROUND OF THE INVENTION

Roll-up heat insulation devices have been developed in widely varied versions. In the rolled-up state, the heat insulation device should take up as small a volume as possible, while at the same time providing a heat insulation effect subsequent to unrolling. Thus, by way of example, EP-PS 0 160 686, discloses a roll-up heat insulation device whose particular advantage resides in the circumstance that, when being unrolled, automatic, large-volume air chambers are formed, into which air is drawn by suction laterally. When rolled up, these air chambers are compressed so that the planar heat insulating structure takes up very little space and, for this reason, can be readily accommodated inside a take-up box. NL-A-78 05 464, discloses a roll-up heat insulation device in the form of a planar structure which, in the unrolled state, forms a multichamber system for providing air-filled, preferably circulation-free compartments, whose volume can be reduced when being rolled up and which is constructed in the form of a heat insulating mat which possesses at least two consecutively disposed foils, in which, spaced-apart distance webs are disposed between two adjacent foils.

SUMMARY OF THE INVENTION

The present invention relates to the problem of developing a roll-up heat insulation device in such a way that, with a continued modest space requirement in the taken-up or rolled-up state, better heat insulation values can be achieved while, at the same time, increasing the transparency and the provision of additional light-controlling effects.

This problem is resolved with the planar structure to be constructed in the form of a multilayer insulating mat which possesses at least two consecutively disposed, highly transparent foils, whose reciprocal parallel distance is controllable by means of webs that are offset in the vertical distance and which are flexibly connected with adjacent foils in each case. With the heat insulating mat in the rolled-up state, the webs take up only a very small space, such that the thickness can be kept at a value of below 1 mm, In the unrolled state, the webs are utilized for spreading the consecutively disposed foils apart, and in a fashion similar to a controlling parallelogram becomes widest when the angle between web and foil surface is 90°. In this position, the parallelogram at the same time attains its greatest horizontal bracing.

Relative to the very small space required after being rolled up, a maximum hollow space volume can be effective for providing heat insulation. In this connection an additional advantage results in that the spacing webs, by means of pertinent coatings, can also be used for selectively controlling the light conditions in a building whose windows are equipped with the roll-up heat insulation device according to the invention, by changing the angular positions of the webs relative to the foil surfaces.

Since the hollow spaces enclosed between the consecutively disposed foils can be closed laterally with the aid of a controlled closing means, all circulation in the heat insulation chambers can be eliminated and the heat insulating effect additionally improved. According to a first embodiment, the closing means is formed by two laterally disposed closing plates which, when the heat insulation mat is fully extended, can then be urged laterally against the mat while under a time-related control. In the process, an elastic sealing layer is preferably used which largely protects the heat insulating mat structure from damage.

A particularly simple method of controlling the distance between adjacent foils results with the use of weights on each foil. It has been shown that the weights, in connection with the vertically spaced-apart webs, provides adequate tension for the multilayer heat insulating mat so that the heat insulating mat—in the fully extended or expanded state—is hardly perceived by the viewer, irrespective of whether it is looked at from the inside or from the outside of the building. This bracing principle opens up the possibility of working with extremely thin foils possessing a thickness in the range of between 0.1 and 0.2 mm. In this case, an additional advantage results in that the weights, in connection with the take-up or rolling-up means, can be utilized for controlling the distance of adjacent foils and, with this, for the angle-wise positional control of the webs relative to the heat insulating mat surface area. Thereby, three fundamental functions of the heat insulating mat according to the present invention can be realized:

In the fully expanded state of the heat insulating mat, i.e. with the foils at a maximum distance from each other, a brightening effect is realized, in which the horizontally arranged webs are utilized for reflecting the sunlight into the interior of the building.

The second function consists in bringing about a certain darkening, i.e. a partial reflection of the incident light which does occur when the webs are inclined by approximately 45° relative to the foil surface.

Finally, by means of a suitable construction or material selection within the area of the webs, a darkening effect of the room can be achieved which exists when the web joints are fully folded together or folded up, i.e. when they are aligned parallel to the adjacent foils.

Depending on the desired outcome, the foils may be formed of all conceivable materials, such as highly transparent, i.e. crystal-clear and transparent possessing an increased heat insulation effect due to a partial metallization of the foils without impairing the three fundamental factors described in the foregoing.

The external master or mother foil of the externally mounted insulating mat could, on the other hand, in the case of need, for reasons of an increased protection from the weather and against burglary, be comprised of a highly tear-resistant plastic mat with an incorporated metallic fabric.

The effects stated above can be realized when at least two consecutively disposed thin foils are employed. However, the advantageous structure of the heat insulating mat according to the present invention provides particularly advantageous effects when more than two consecutively arranged foils, such as five or six such foils, with the aid of identical web arrangements, are connected so as to form a parallelogram-controlling structure.

The jointed connection of the adjacent foils by means of the distance webs is preferably effected with the aid of hinge-like constructed bonding flaps, which consequently possess two flap legs interconnected by means of a film hinge, which may also be formed in a tensionless fashion by we welldable foil material, in which case one of the legs is connected to the web and the other leg to the foil adjoining thereto. The bonding flaps are disposed at both ends of the web on, in each case, different sides so that the film hinge is stressed in an identical manner in the parallelogram-like displacement for controlling the distance of adjacent foils on both sides of the web end.

When the vertical distance of the webs corresponds exactly to the maximal width, i.e. the width of the heat insulating mat in the maximally expanded state of the latter, it is possible for the three fundamental functions described above to be optimally realized. It is nevertheless possible to reduce the predetermined vertical distance of the horizontally oriented webs for optimizing the heat insulation values relative to each other.

It has been shown that the concept according to the invention, even when employing the thinnest foils, does make it possible, especially while utilizing the individual weights for each foil, to provide a smoothly taut heat insulating mat of the highest degree of transparency. The rotational movement in a rolling up operation can thereby be utilized in an exceedingly favorable manner for controlling the distance of the foils from each other.

With respect to the timewise or time-related control, it is possible to operate the roll up device with sensor contacts that automatically cause the closing means to enter into operation or to cease operating when the position of the heat insulating mat permits or requires this. In this manner, the heat insulation device is equally suited for an internally fitted or an externally mounted window insulation, in which, on account of the total transparency of the entire heat insulating mat, a glass surface insulation during the winter months is possible around the clock in dwelling or office areas as well as in other areas. The controller with the aid of the sensor technique provides the possibility of solar energy storage. When the sun shines, the insulating mat is rolled up. As soon as this stored energy threatens to flow outward through the windows again, the unrolled insulating mat impedes this process. When at least one externally located mother foil is guided in a lateral rail into which a lip-seal is integrated, an adequate airtightness can be achieved if mounted externally. When mounted internally, this construction presents the water vapor permeability to the cold window panes, so that the formation of a so-called "ice carapace" cannot take place.

With the use of an additional double lip seal and the lower seals, an effective air sealing against water vapor diffusion can be achieved.

A particularly advantageous construction succeeds in additionally stabilizing the heat insulating mat so that, even when mounted externally, flapping due to wind influences can be effectively eliminated. Here the horizontal web formations likewise act as stabilizers.

By means of the novel insulating web technique the possibility is also provided of using the heat insulation device in conjunction with sloping or horizontally arranged glass surfaces since the motional sequences can in that case be effected with the aid of a cable line or the like.

BRIEF DESCRIPTION OF THE DRAWINGS

The advantages and features of the present invention will become apparent from the following descriptions of the embodiments, taken in conjunction with the accompanying drawings, where like numbers represent like elements, in which:

FIGS. 6 show schematic diagrams showing the underlying principle of the elucidation of the function of the roll-up heat insulation device in the form of a controlledly expandable heat insulating mat.

DETAILED DESCRIPTION OF THE EMBODIMENTS

Figure 1:
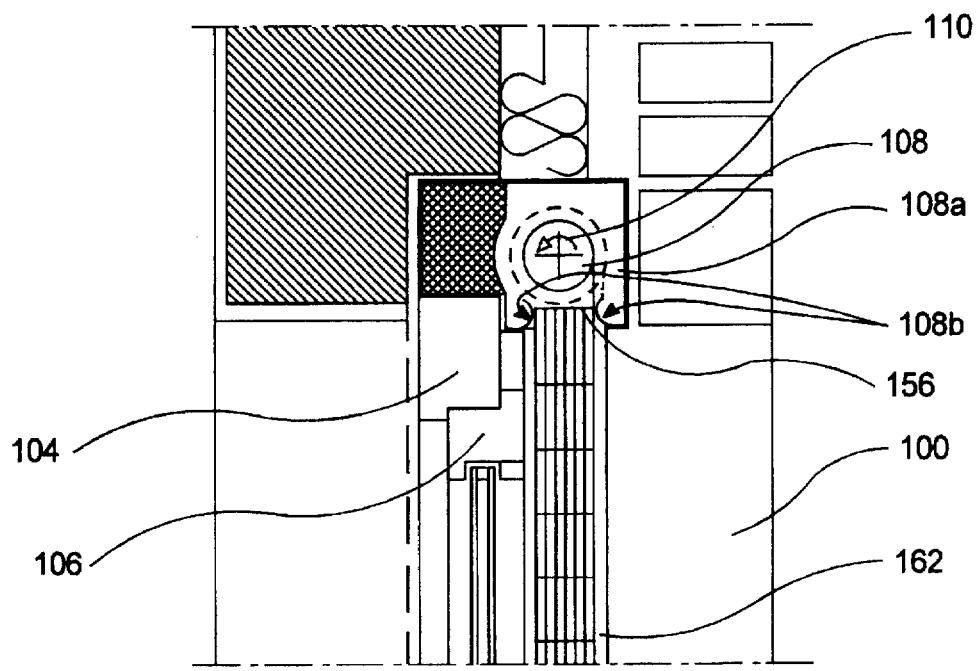
FIG. 1 shows a vertical section within the area of a building window which is fitted with an externally mounted roll-up heat insulation device according to a first embodiment.
Figure 1:
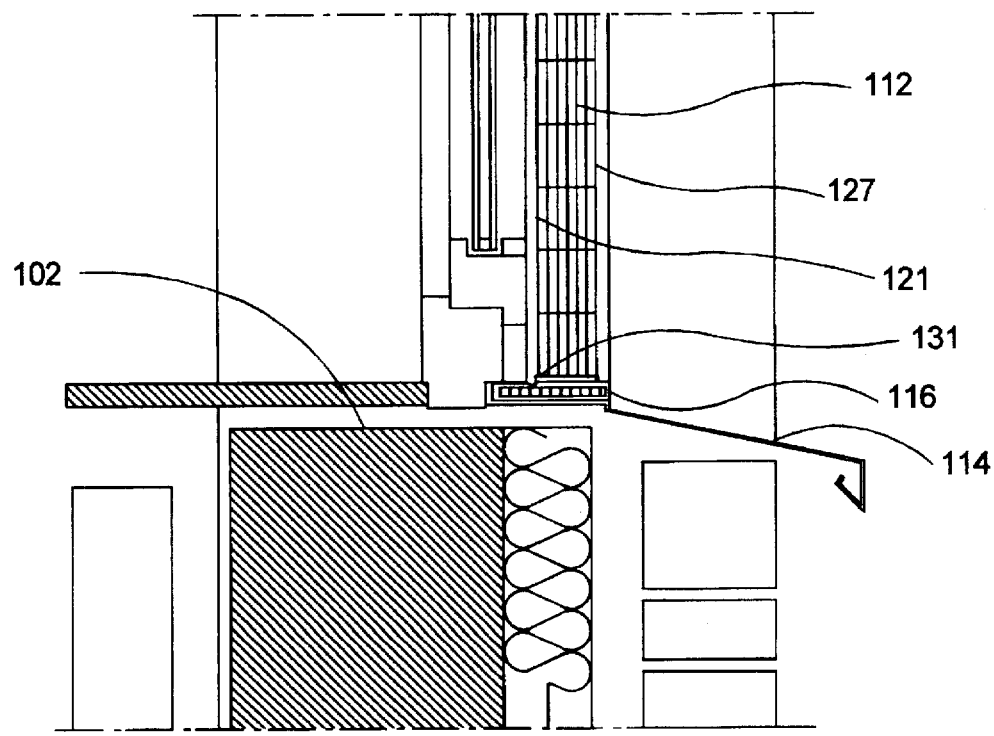

In FIG. 1, a first embodiment of a roll-up heat insulation device in the form of a heat insulating mat is identified with 100, which is mounted in a window opening 102 of a building. In this embodiment the heat insulation device is fitted externally, i.e. in front of a window frame 104 with associated casement 106. Above the window frame 104, a take-up roller 108 is mounted horizontally, upon which—as indicated by the arrow 110—a heat insulating mat 112 to be described in greater detail hereinafter, can be rolled or taken up. The entry area of the space 108a comprising the take-up-roll or roller is in this case provided with lip seals in order to achieve an air sealing against water vapor diffusion. A water run-off plate is identified with 114 and a bottom plate with 116, whose function will be described in greater detail below.

The heat insulating mat 112 consists of several, in the embodiment depicted according to FIG. 1, seven, consecutively arranged thin foils having a thickness in the range of 0.1 to 0.2 mm. These foils are fabricated from highly transparent material, which may be additionally provided with a thermal radiation-reflecting coating or some other type of coating. These foils are identified with the reference numbers 121 to 127. The heat insulation mat 112, for example, when in the fully expanded state, has a total thickness extension of approximately 60 mm. This thickness is achieved in that the individual foils 121 to 127 are stabilized in the expanded state by means of a specially designed bracing system. This bracing system is explained in the following while reference is made to FIGS. 6 to 8.

It becomes apparent from these illustrations that each foil, at the bottom, carries a weight 131 to 137 which, by way of example, is constructed in the form of a horizontally proceeding metal bar. Between two adjacent foils at a time, at a vertical distance AV, which corresponds substantially to the maximum thickness DMAX of the heat insulating mat 112, distance webs 142 to 147 are disposed which are of identical construction and are provided with thin metal or plastic strips with or without a radiation-reflecting coating. The arrangement of consecutively disposed webs 142 to 147 is such that the terminal point of the first web 142 is substantially located at the point where the terminal point of the following web 143 joins up. In this way, consecutively disposed webs, in the extended or unrolled state of the heat insulating mat 112, lie in parallel planes 150 relative to each other.

The connection of the webs 142 to 147 with the foils 121 to 127 is provided with the aid of hinge-like elements 152, of which one leg 151 is connected to the foil and the other leg 153 is connected to the web in question, or, by way of example, bonded in a tensionless manner. Between the legs 151, 153, a flexible joint, for example in the form of a film hinge joint, is formed. The joint elements 152 within the area of the respective opposite ends of the webs 142 to 147 are disposed on different sides of the webs. With this construction the following mode of operation results:

In a first embodiment, with the aid of the take-up roll 108 and a strap or belt connection assembly not depicted in greater detail between the same and an upper web structure 156, the angle alpha, which is formed of the upper web structure 156 with the horizontal plane EH and with this also the angle between the parallel planes 150 and a horizontal plan EH is set. The foils 121 to 127 are thereby staggered vertically, as is revealed by FIG. 7. This is made possible in that the joint elements 152 enter into operation simultaneously and with the same load application so that, in the completely expanded state of the heat insulating mat 112, the air chambers 160 possessing a rectangular cross-section become narrower and receive the cross-section of a parallelogram.

FIG. 6 shows the heat insulating mat 112 in a position in which the vertical staggering of the consecutively disposed foils 121 to 127 is greatest. In this position, the webs 142 to 147 are vertical, i.e. they are aligned so as to be parallel to the foils. This state is assumed by the foils when the take-up operation is initiated. It is obvious that, in this state, the thickness assumes a minimum i.e. dimension DMIN which, when acted upon by a lateral force as occurs when being rolled up onto the take up roll or roller 108, can still be significantly reduced. The heat insulating mat 112 does take up an extremely small amount of structural space when rolled up, although in the fully expanded state—as becomes apparent from FIG. 8 or FIG. 1—a relatively large air cushion volume is provided in the air chambers 160.

FIG. 1 shows the heat insulation device intended for external mounting, i.e. for the case that the heat insulating mat 112 is to be disposed outside the casement 106. In order to provide additional stabilization of the heat insulating mat 112 against the action of the wind, weights 131 of a ferromagnetic material, such as e.g. steel or iron, with the bottom plate consists of a magnetized material is provided. The individual foils are extended thereby in the completely unrolled state of the heat insulating mat so that, even at elevated wind speeds, no unpleasant deformations of the heat insulating mat 112 result.

A guide rail is identified with 162, with the aid of which a guide lug nut shown in greater detail in FIG. 1 of the outermost mother foil 127, is engaged so as to provide an absolute airtightness with respect to the wind. A stable air cushion between rear side insulating mat and window element has to be present in order to prevent the heat dissipation on the side of the room. The function of this sealing will be described in greater detail hereinafter with the aid of FIG. 5 which represents a horizontal section through a somewhat modified embodiment of the heat insulation device generally identified with 200. The construction of the heat insulation mat 212 is substantially comparable with that of the previously described embodiment according to FIGS. 1, and 6 to 8 so that similar reference numbers are employed for corresponding components, which, however, in lieu of the "1", bear a "2" in the form of a first digit.

Figure 5:
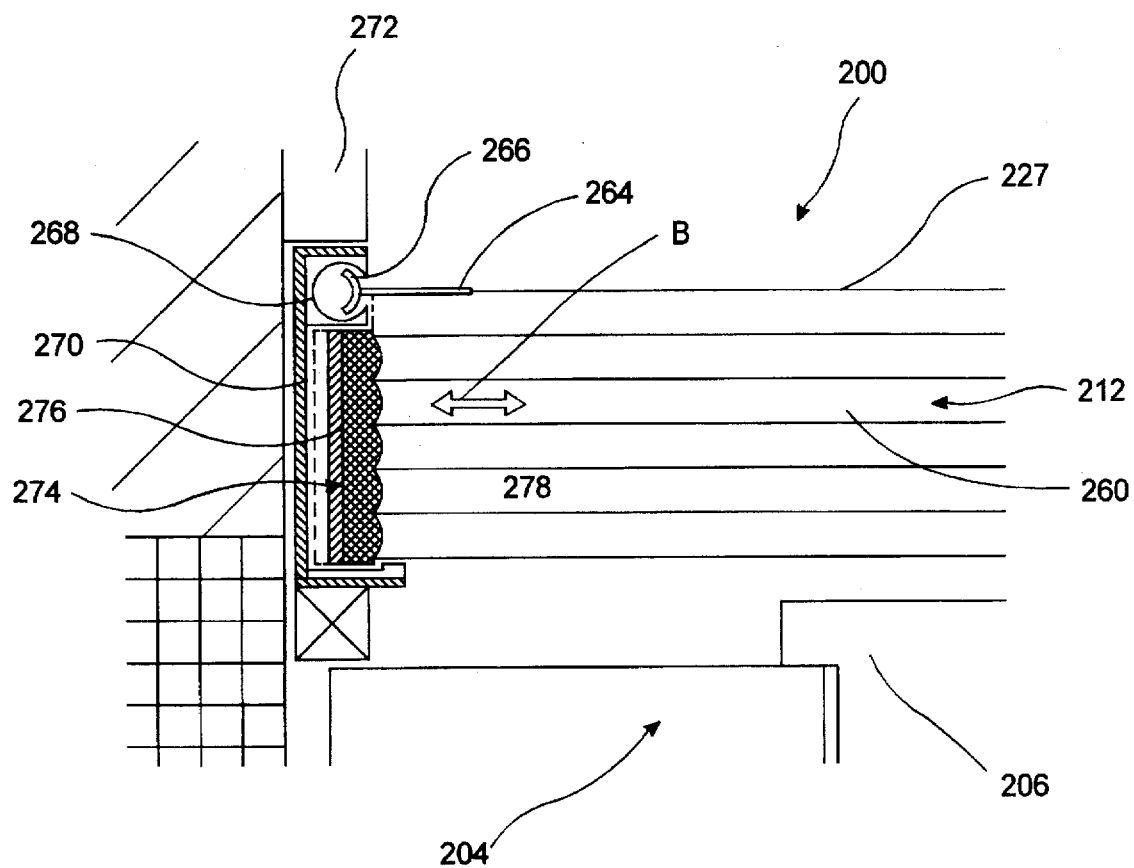
FIG. 5; shows a horizontal section through the window opening, in which another embodiment of the roll-up heat insulation device is accommodated.

It can be discerned from this embodiment that the external mother foil 227 carries a guide extension 264 on the side of the edge which engages into a lateral guide 268 with lip sealing with a shaped part 266. The lateral guide 268 is located in a box 270 which is preferably embedded in the plaster 272. In the box 270, which, incidentally, is also provided in the embodiment according to FIG. 1. A vertically aligned closing plate 274, consists of a base 276 and a sealing layer 278 which, by way of example, is formed by a cellular rubber mat. The closing plate 274 is displaced in the lateral direction, which is indicated by the double arrow B. In FIG. 5, the closing plate 274 position is indicated with broken lines, this position being assumed by the closing plate 274 when the heat insulation mat 21 2 is extended.

In the fully extended state, a control means becomes operative to move the lateral closing plates 274 to the lateral surfaces of the heat insulation mat 212 thereby providing a hermetic sealing of the air chambers 260. The control of the pressing means for the closing plates 274 can be brought about with the aid of a sensor contact actuated by the outermost weight. Conversely, when the outermost weight or counterweight is raised again, the closing plate assembly is pulled away laterally, in which connection a flexible tongue can be employed. This mechanism offers the advantage that the rolling up operation of the heat insulating mat 212 is not hindered. When extended in the course of being enlarged by the web expansion of the air volume enclosed between the foils, an unimpeded lateral drawing in of air by suction is rendered possible. The air chambers are only closed when they have been expanded to their full size so that a maximum of heat insulation effect is provided. In one embodiment, the closing plate 274 is moved laterally upward or downward in order to be simultaneously capable of performing a certain tautening function of the heat insulating mat structure 212.

Figure 2:
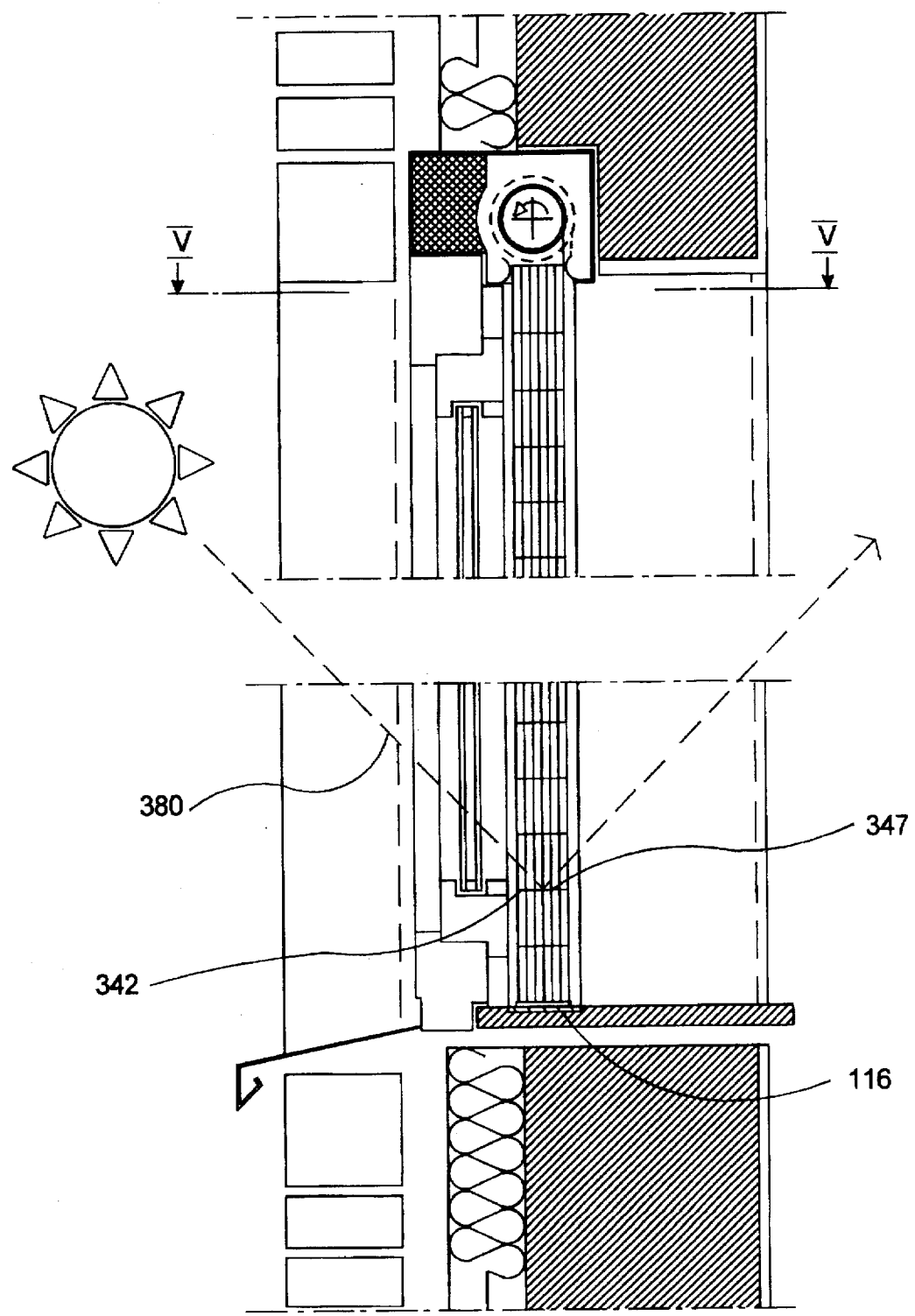
FIG. 2 shows a view similar to FIG. 1 of a further embodiment of the invention in an internally mounted first embodiment.
Figure 3:
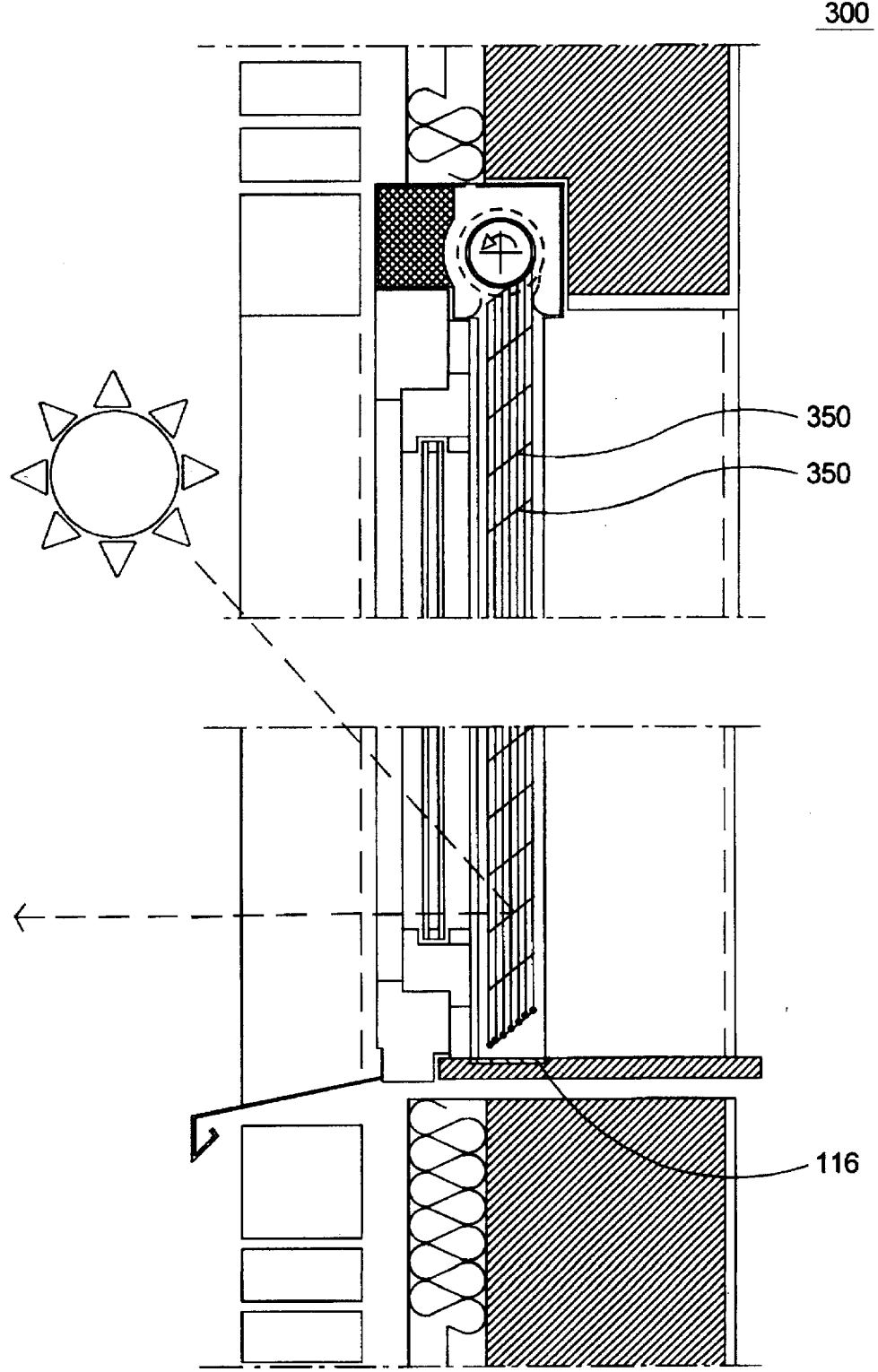
FIG. 3 shows a view similar to FIG. 2 of the heat insulation device according to FIG. 2 in a second position.
Figure 4:
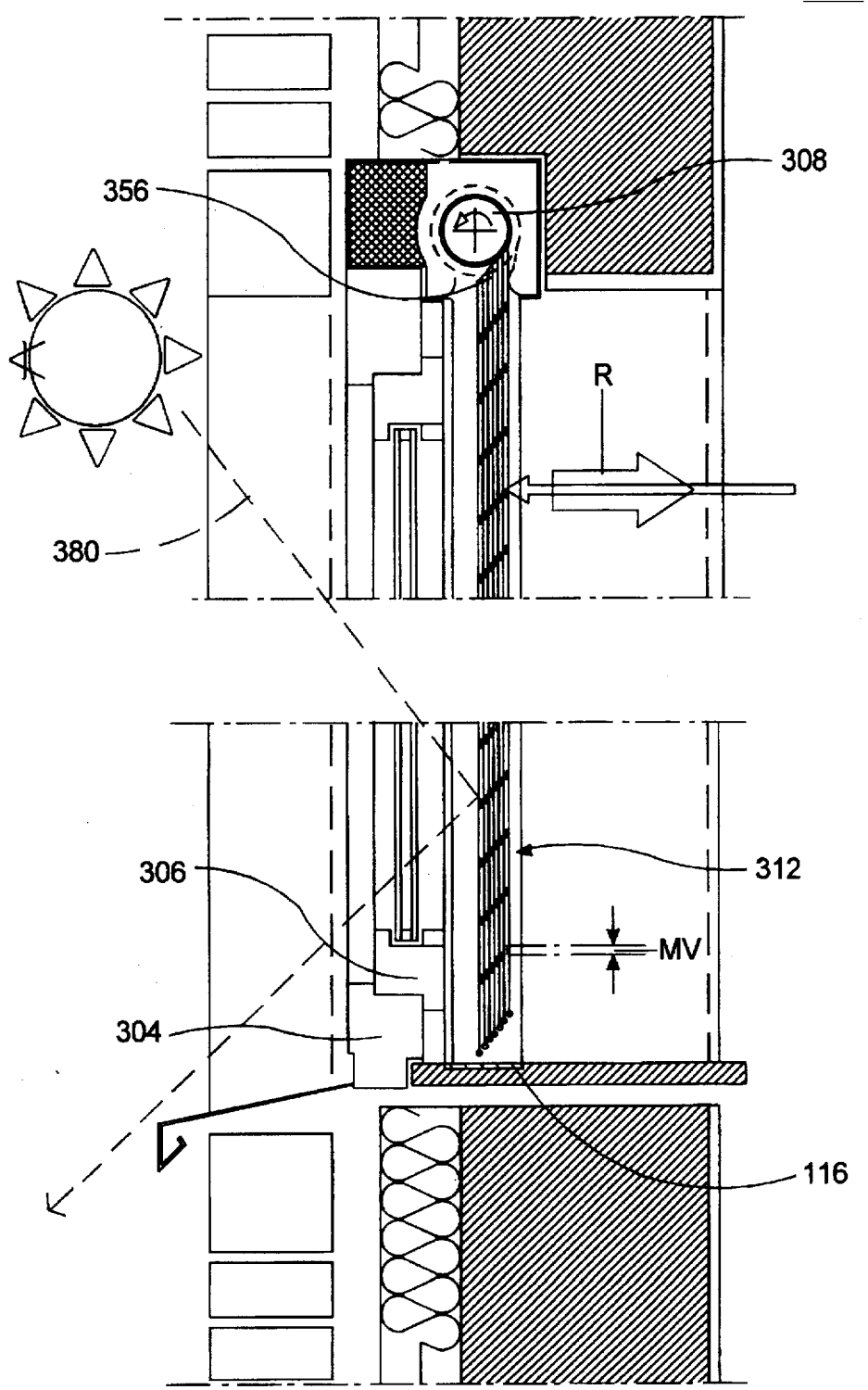
FIG. 4 shows the heat insulation device according to FIGS. 2 and 3 in a third position.

Finally, with the aid of a further embodiment of the heat insulation device, which is meant to be mounted internally, it is explained with the aid of FIGS. 2 to 4. This third embodiment is generally identified with 300. Elements which are comparable to or identical with those already found in the previously described embodiments, are identified with similar reference numbers, in which, in lieu of the "1", a "3" is placed as a first number.

FIG. 4 shows the heat insulating mat 312 in a position assumed immediately after being unrolled, in which the top most web structure 356, by means of the retaining strap assembly not shown in greater detail, is kept so stiff that the webs 342 to 347 possess a maximal offset dimension MV. Due to the dimensioning of the web length described in the foregoing in such a way that the sum of the consecutively disposed webs corresponds to the vertical distance AV, in the position as per FIG. 4, an almost complete darkening of the building interior results, which is indicated with the arrow R. When the heat insulating mat 312, by means of a further slackening of the take-up roll 308, is extended a little further, the distance webs 342 to 347—as described with the aid of FIG. 7—align themselves in a series of parallel planes 350. Since the webs 342 to 347 are preferably light-reflecting, sun rays 380 continue to be reflected so that a certain darkening effect inside the building interior can be realized. In the fully extended state, i.e. in the state in which the heat insulating mat 312 is expanded to its full width—as shown in FIG. 2—the successively located webs 342 to 347 now aligned in horizontal planes can be used to brighten the room, which is intended to be indicated by the sun ray 380 reflected into the room interior.

FIG. 2 reveals that the representation according to FIG. 5 can also be understood as a section in the direction of Line V—V in FIG. 2. However, at this point it should be emphasized that the embodiment presented in FIG. 5 in an identical design, can also be utilized when the heat insulating mat is mounted externally.

The foregoing description of the embodiments has been presented for the purposes of illustration and description. It is not intended to be exhaustive or limit the invention to the precise form disclosed. Modifications and variations of the invention are possible in light of the above teaching. A roll-up mat insulation device was chosen and described in order to best explain the principals of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A roll-up heat insulation device, comprising:

a planar structure which, in an unrolled state, forms a multichamber system providing air-filled and substantially circulation-free compartments having a volume which can be reduced when the device is rolled up, said planar structure constructed of a heat insulating mat including at least two consecutively disposed foils having a reciprocal distance controlled by distance webs staggered at a vertical distance and flexibly coupled to an adjacent foil, said at least two foils having a first end and a second end, each said first end connected to a weight operative to reduce the vertical staggering of said foils, said second end coupled to a roller, said weight further includes bars of ferromagnetic material operative to stabilize the insulating mat, and a magnetized plate coupled to the second end of the device, against said weights operative to tighten the foils, wherein in an unrolled state said distance webs are substantially parallel to said foils.

2. The heat insulating device according to claim 1, wherein the coupling with the roller providing said web structure aligned in a horizontal plane.

3. The heat insulation device according to claim 1, wherein the heat insulation mat possesses more than two foils and wherein the distance webs are arranged so that, in the unrolled state of the mat, said distance webs lie in a plane parallel to each other.

4. The heat insulation device according to claim 3, wherein the distance webs, in the fully expanded state of the insulating mat, are located in horizontal planes at a predetermined reciprocal vertical distance.

5. The heat insulation device according to claim 1, wherein the vertical distance of the distance webs corresponds to a maximally expanded state.

6. The heat insulation device according to claim 1, wherein hollow spaces are enclosed between the consecutively disposed foils, said foils operatively connected to have open and closed positions.

7. The heat insulation device according to claim 6, wherein the closed position is formed by one closing plate disposed vertically to the planar extension of the heat insulating mat, which, on one side facing the foil side edges, is provided with an elastic sealing.

8. The heat insulation device according to claim 7 wherein the elastic sealing is provided with a cellular rubber plate.

9. The heat insulation device according to claim 1, wherein at least one externally located mother foil is guided on a lateral rail, into which a lip seal is integrated.

10. The heat insulation device according to claim 1, wherein the foils are comprised of highly transparent material.

11. The heat insulation device according to claim 1 wherein the foils have a thickness of in the range approximately 0.1 to 0.2 mm.

12. The heat insulation device according to claim 1 wherein the foils are metallized.

13. The heat insulation device according to claim 1 wherein the distance webs are comprised of metallized plastic material.

14. The heat insulation device according to claim 1 wherein the distance webs are comprised of plastic and are provided with a radiation-reflecting coating or composition.

15. The heat insulation device according to claim 11, wherein said foils are comprised of plastic.

* * * * *